United States Patent
Hayasaka

(10) Patent No.: US 6,859,003 B2
(45) Date of Patent: Feb. 22, 2005

(54) FORCE SENSE IMPARTING/INPUTTING APPARATUS CAPABLE OF PREVENTING OSCILLATION OF OPERATION MEMBER, AND IMPARTING FORCE SENSE

(75) Inventor: Satoshi Hayasaka, Miyagi-ken (JP)

(73) Assignee: Alps Electric Co., Ltd., Tokyo (JP)

(*) Notice: Subject to any disclaimer, the term of this patent is extended or adjusted under 35 U.S.C. 154(b) by 0 days.

(21) Appl. No.: 10/665,302

(22) Filed: Sep. 18, 2003

(65) Prior Publication Data

US 2004/0061463 A1 Apr. 1, 2004

(30) Foreign Application Priority Data

Sep. 30, 2002 (JP) ........................................ 2002-286385

(51) Int. Cl.$^7$ .............................................. H02P 1/22
(52) U.S. Cl. .............................. 318/281; 318/1; 318/2; 345/161; 463/37
(58) Field of Search ............................... 318/281, 1, 2; 345/161; 463/37

(56) References Cited

U.S. PATENT DOCUMENTS

| | | | | |
|---|---|---|---|---|
| 3,869,121 A | * | 3/1975 | Flavell | 482/2 |
| 5,959,613 A | * | 9/1999 | Rosenberg et al. | 345/161 |
| 6,067,077 A | * | 5/2000 | Martin et al. | 345/161 |
| 6,079,513 A | * | 6/2000 | Nishizaki et al. | 180/402 |
| 6,278,439 B1 | * | 8/2001 | Rosenberg et al. | 345/157 |
| 6,380,925 B1 | * | 4/2002 | Martin et al. | 345/161 |
| 6,636,197 B1 | * | 10/2003 | Goldenberg et al. | 345/156 |

* cited by examiner

*Primary Examiner*—Rita Leykin
(74) *Attorney, Agent, or Firm*—Brinks Hofer Gilson & Lione

(57) ABSTRACT

Force in a direction opposite to an operating direction imparted from a motor to a rotary knob is increased gradually at the start of an operation to an upper limit value with the increase of a rotating angle of the rotary knob in the same direction as the operating direction, and is gradually decreased at the finish of the operation from the upper limit value to 0 with the increase of the rotating angle in the opposite direction to the operating direction. In consequence, when the operation is stopped before or at the time at which force in the opposite direction to the operating direction imparted to the rotary knob reaches the upper value, the rotary knob returns to the angle at which it has existed before operated, and can come to halt without oscillation.

3 Claims, 2 Drawing Sheets

FORCE SENSE IMPARTING/INPUTTING APPARATUS CAPABLE OF PREVENTING OSCILLATION OF OPERATION MEMBER, AND IMPARTING FORCE SENSE

BACKGROUND OF THE INVENTION

1. Field of the Invention

This invention relates to a force sense imparting/inputting apparatus that can generate a force sense in an operation member operated manually.

2. Description of the Related Art

A mechanical inputting apparatus in which an operation member is allowed to rotate or to linearly move by a mechanism is known. In the mechanical inputting apparatus of this kind, frictional force develops between members and operates as resistance force when the operation member is operated.

In a force sense imparting/inputting apparatus for generating a force sense by imparting torque or force to an operation member from an electric actuator that is electrically controlled, however, no apparatus is known that generates a force sense such as frictional force in the operation member, and such a force sense imparting/inputting apparatus has been desired.

Therefore, the inventor of this invention has started developing the invention to satisfy the requirement described above and has produced the following prototype in a development stage of the invention.

The prototype of the force sense imparting/inputting apparatus in the development stage of the invention includes an operation member capable of operating and rotating in both normal and opposite directions, such as a rotary knob, an electric actuator capable of imparting torque in both normal and opposite directions to the rotary knob, such as a motor, detection means for detecting an rotating direction and an rotating angle of the rotary knob, and control means for controlling the motor, that is, a CPU, so that force of a predetermined magnitude in the opposite direction to the rotating direction of the operation member can be imparted to the operation member in accordance with the operating direction of the operating member detected by the detection means.

Incidentally, no prior art reference that discloses any description related with the invention has been found up to this date.

SUMMARY OF THE INVENTION

The prototype of the force sense imparting/inputting apparatus described above can cause torque in the direction opposite to the rotating direction of the rotary knob to operate as the resistance force during operation. When the rotary knob rotates even a little in the normal or opposite direction, however, torque in the opposite direction to the rotating direction is imparted to the rotary knob, so that the rotary knob easily oscillates and cannot be kept at halt under a stable state.

In view of the problem described above, the invention aims at providing a force sense imparting/inputting apparatus in which an operation member does not easily oscillate.

To accomplish the object, the invention provides a force sense imparting/inputting apparatus comprising an operation member capable of operating in both normal and opposite directions, an electric actuator capable of imparting force in both normal and opposite directions to the operation member, detection means for detecting an operating direction and an operating amount of the operation member, and control means for controlling the electric actuator so that force in the opposite direction to the operating direction of the operation member can be imparted to the operation member in accordance with the operating direction detected by the detection means, wherein the control means is set so that force in the opposite direction to the operating direction imparted from the electric actuator to the operation member increases at the start of the operation of the operation member from 0 to a predetermined upper limit value with the increase of the operating amount of the operation member on the basis of a predetermined function, the force in the opposite direction to the operating direction imparted from the electric actuator to the operation member is kept at the upper limit value during the operation of the operation member, and the force in the opposite direction to the operating direction imparted from the electric actuator to the operation member decreases at the finish of the operation of the operation member from the upper limit value to 0 with the increase of the moving amount of the operation member in the opposite direction to the operating direction of the operation member on the basis of the predetermined function.

The invention having the construction described above operates in the following way.

When the operation member is operated, the detection means detects the operating direction of the operation member and its operating amount. A detection signal corresponding to the operating direction and the operating amount is outputted to the control means. The control means calculates the force in the opposite direction to the operating direction, that is to be imparted to the operation member, on the basis of the operating direction of the operation member and its operating amount, the predetermined function and the predetermined upper limit value, and controls the electric actuator on the basis of this calculation result.

Consequently, the force in the opposite direction to the operating direction imparted to the operation member gradually increases from 0 to the upper limit value at the start of the operation of the operation member on the basis of the predetermined function. The force in the opposite direction to the operating direction imparted to the operation member is kept at the upper limit value during the operation of the operation member. The force in the opposite direction to the operating direction imparted to the operation member operates in this way as the resistance force to the operation member during its operation.

When the operation of the operation member is finished, the force in the opposite direction to the operating direction gradually decreases from the upper limit value to 0 with the increase of the moving amount of the operation member in the opposite direction to the operating direction on the basis of the predetermined function. In consequence, the operation member stops. In other words, when the operating amount does not increase any more, the operation member is allowed to move in the opposite direction to the operating direction and then to stop by the force in the opposite direction to the operating direction.

As described above, according to the invention, the force in the opposite direction to the operating direction imparted from the electric actuator to the operation member is gradually increased from 0 to the upper limit value at the start of the operation of the operation member and when the operation of the operation member is finished, the force in the opposite direction to the operating direction imparted from the electric actuator to the operation member is gradually decreased from the upper limit value to 0 with the increase of the moving amount of the operation member in the opposite direction to the operating direction. Therefore, when the operation is finished before, or at the point at which, the force in the opposite direction to the operating direction imparted to the operation member reaches the upper limit value, the operation member returns to the position at which it has existed before the operation and comes to halt without oscillation. In other words, the operation member according to the invention does not easily oscillate.

In the invention, the predetermined function described above may well be a linear function having a gradient greater than 0. In the invention having such a construction, setting of the function can be easily made.

In the invention, the operation member may be arranged in such a fashion as to be capable of rotating in both normal and opposite directions and the electric actuator may be a motor capable of imparting torque in both normal and opposite directions to the operation member. The invention having such a construction can impart torque to the operation member with a simple construction.

DESCRIPTION OF THE PREFERRED EMBODIMENT

A force sense imparting-inputting apparatus according to the invention will be hereinafter explained.

Figure 1:
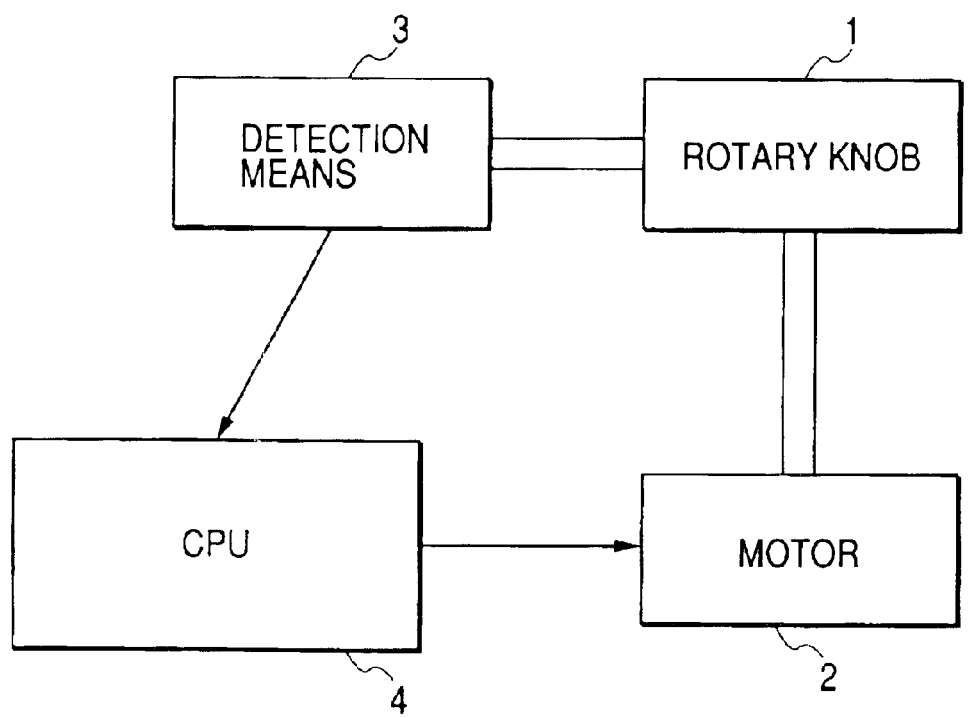
FIG. 1 shows a construction of a force sense imparting inputting apparatus according to an embodiment of the invention.
Figure 2:
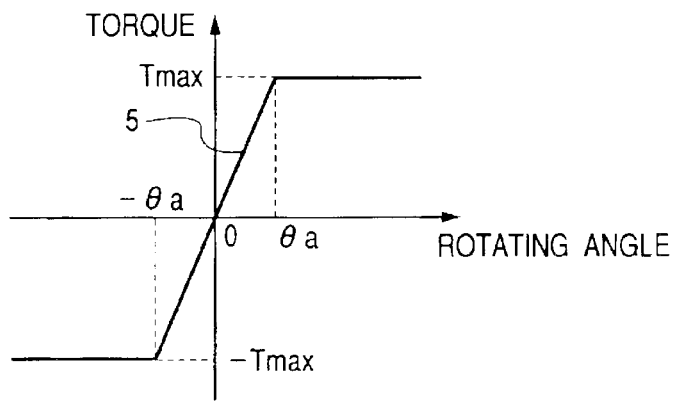
FIG. 2 shows a function and an upper limit value set to control means provided to the embodiment shown in FIG. 1.
Figure 3:
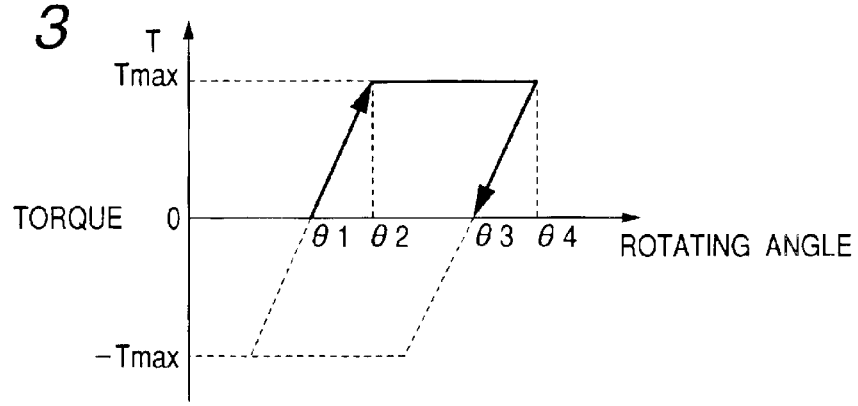
FIG. 3 shows an example of the operation of the embodiment shown in FIG. 1.
Figure 4:
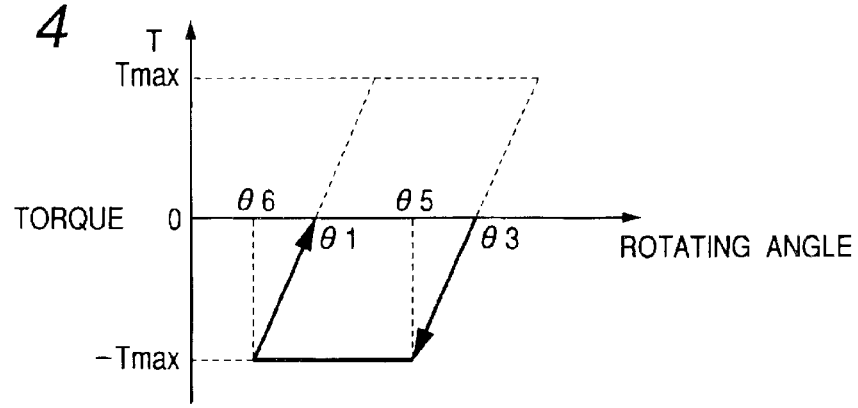
FIG. 4 shows another example of the operation of the embodiment shown in FIG. 1.

FIG. 1 shows a construction of a force sense imparting/inputting apparatus according to an embodiment of the invention. FIG. 2 is a graph showing a function and an upper limit value set to control means provided to the embodiment shown in FIG. 1. FIG. 3 is a graph showing an example of the operation of the embodiment shown in FIG. 1. FIG. 4 is a graph showing another example of the operation of the embodiment shown in FIG. 1.

As shown in FIG. 1, this embodiment includes an operation member so arranged as to be capable of rotating in normal and opposite directions, such as a rotary knob 1, an electric actuator for imparting torque to the rotary knob 1 such as a motor 2, detection means 3 for detecting an operating direction and an operating amount of the rotary knob 1, that is, a rotating direction and a rotating angle of the rotary knob 1, such as an encoder or a potentiometer, and control means for controlling the motor 2 so as to impart torque in the opposite direction to the rotating direction to the rotary knob 1 in accordance with the rotating direction of the rotary knob 1 detected by the detection means 3, that is, a CPU 4.

A function 5 and an upper limit value Tmax (−Tmax) shown in FIG. 2 are set to the CPU 4 to calculate the torque imparted to the rotary knob 1. In FIG. 2, a value of the torque in the opposite direction imparted to the rotary knob 1 when the rotary knob 1 rotates in one direction is a positive value and the value of the torque imparted to the rotary knob 1 when the rotary knob 1 rotates in the other direction is a negative value.

The function 5 described above is set to a linear function having a gradient greater than 0. In the case where the rotary knob 1 is operated and rotated in one direction, the torque in the opposite direction increases at the start of the operation of the rotary knob 1 from 0 to the upper limit value Tmax with the increase of the rotating angle of the rotary knob 1 in one direction, that is, until the rotary knob 1 is rotated to a rotating angle θa in one direction. The torque in the opposite direction imparted to the rotary knob 1 is kept at the upper limit value Tmax while the rotary knob 1 is operated. When the operation of the rotary knob 1 is finished, the torque in the opposite direction imparted to the rotary knob 1 decreases from the upper limit value Tmax to 0 with the increase of the rotating angle of the rotary knob 1 in the opposite direction until the rotary knob 1 is rotated to the angle θa in the opposite direction.

Similarly, when the rotary knob 1 is operated and rotated in the opposite direction, the torque in one direction imparted to the rotary knob 1 increases at the start of the operation of the rotary knob 1 from 0 to the upper limit value Tmax (−Tmax in FIG. 2) with the increase of the rotating angle of the rotary knob 1 in the opposite direction, that is, until the rotary knob 1 is rotated to a rotating angle θa (−θa in FIG. 2) in the other direction, when the rotary knob 1 is rotated in the other direction. The torque on one direction imparted to the rotary knob 1 is kept at the upper limit value Tmax (−Tmax in FIG. 2) while the rotary knob 1 is operated. When the operation of the rotary knob 1 is finished, the torque in one direction imparted to the rotary knob 1 decreases from the upper limit value Tmax to 0 with the increase of the rotating angle of the rotary knob 1 in one direction until the rotary knob 1 is rotated to the angle θa in one direction.

The embodiment having the construction described above operates in the following way.

When the rotary knob 1 is operated, the detection means 3 detects the rotating direction and the rotating angle of the rotary knob 1 and outputs detection signals corresponding to the rotating direction and to the rotating angle to the CPU 4. The CPU 4 calculates the force in the direction opposite to the rotating direction to be imparted to the rotary knob 1 and outputs the control signal corresponding to this calculation result to the motor 2, and the motor 2 operates.

When the rotary knob 1 is operated and rotated in one direction such as when the rotary knob 1 is operated and rotated from an angle θ1 to an angle θ4 as shown in FIG. 3, the torque in the opposite direction imparted to the rotary knob 1 gradually increases while the rotary knob 1 rotates from the angle θ1 to an angle θ2 (=θ1+θa). The torque in the opposite direction reaches the upper limit value Tmax when the rotary knob 1 rotates to the angle θ2. While the rotary knob 1 rotates from the angle θ2 to the angle θ4, the torque in the opposite direction imparted to the rotary knob 1 is kept at the upper limit value Tmax. The torque in the opposite direction imparted in this way to the rotary knob 1 operates as resistance force to the rotary knob 1 during its rotation in one direction. Therefore, the operator feels as if frictional force acted on the rotary knob 1.

When the rotary knob 1 rotates to the angle θ4 and the operation is finished, the torque in the opposite direction imparted to the rotary knob 1 turns the rotary knob 1 in the opposite direction. While the rotary knob 1 rotates to an angle θ3 (=θ4−θa), the torque in the opposite direction imparted to the rotary knob 1 gradually decreases and reaches 0 when the rotary knob 1 rotates to the angle θ3 (=θ4−θa). In other words, the rotary knob 1 returns from the angle θ4 to the angle θ3 and then stops.

When the rotary knob 1 is operated and rotated in the opposite direction such as when the rotary knob 1 is rotated from the angle θ3 to an angle θ6 as shown in FIG. 4, too, the torque in one direction imparted to the rotary knob 1 gradually increases while the rotary knob 1 rotates from the angle θ3 to an angle θ5 (=θ3−θa). The torque in one direction reaches the upper limit value Tmax (−Tmax in FIG. 4) when the rotary knob 1 rotates to the angle θ5. While the rotary knob 1 rotates thereafter from the angle θ5 to the angle θ6, the torque in one direction imparted to the rotary knob 1 is kept at the upper limit value Tmax (Tmax in FIG. 4). The torque in one direction imparted in this way to the rotary knob 1 operates as resistance force to the rotary knob 1 during its rotation in the opposite direction. Therefore, the operator feels as if frictional force acted on the rotary knob 1.

When the rotary knob 1 rotates to the angle θ6 and the operation is finished, the torque in one direction imparted to the rotary knob 1 turns the rotary knob 1 in one direction. While the rotary knob 1 rotates to the angle θ1 (=θ6+θa), the torque in one direction imparted to the rotary knob 1 gradually decreases and reaches 0 when the rotary knob 1 rotates to the angle θ1. In other words, the rotary knob 1 returns from the angle θ6 to the angle θ1 and then stops.

When the rotary knob 1 is continuously switched from the rotation in one direction to the rotation in the opposite direction such as when the rotary knob 1 is operated and rotated in one direction to the angle θ4 and is then operated and rotated continuously in the opposite direction, the torque in the opposite direction imparted to the rotary knob 1 gradually decreases from the upper limit value Tmax to 0 while the rotary knob 1 rotates from the angle θ4 to the angle θ3. Subsequently, while the rotary knob 1 rotates from the angle θ3 to the angle θ5, the torque in one direction gradually increases from 0 to the upper limit value Tmax (−Tmax in FIGS. 3 and 4).

Similarly, when the rotary knob 1 is continuously switched from the rotation in the opposite direction to the rotation in one direction such as when the rotary knob 1 is operated and rotated in the other direction to the angle θ6 and is then operated and rotated continuously in one direction, the torque in one direction imparted to the rotary knob 1 gradually decreases from the upper limit value Tmax (−Tmax in FIGS. 3 and 4) to 0 while the rotary knob 1 rotates from the angle θ6 to the angle θ1. Subsequently, while the rotary knob 1 rotates from the angle θ1 to the angle θ2, the torque in the opposite direction gradually increases from 0 to the upper limit value Tmax.

This embodiment provides the following effects.

In this embodiment, the torque in the opposite direction to the operating direction, that is imparted from the motor 2 to the rotary knob 1, is gradually increased from 0 to the upper limit value at the start of the operation of the rotary knob 1 with the increase of the rotating angle of the rotary knob 1 in the same direction as its operating direction, and the torque in the opposite direction to the operating direction, that is imparted from the motor 2 to the rotary knob 1, is gradually decreased from the upper limit value to 0 with the increase of the rotating angle opposite to the operating direction of the rotary knob 1 at the end of the operation. Therefore, when the operation is finished before, or at the point at which, the torque in the opposite direction to the operating direction imparted to the rotary knob 1 reaches the upper limit value, the rotary knob 1 returns to the angle at which it has existed before the operation, and stops without oscillation. In other words, the rotary knob 1 in the invention does not easily oscillate and hence, the rotary knob 1 can be kept at halt under the stabilized state.

In the embodiment, the function 5 for calculating the torque to be imparted to the rotary knob 1 is set to the linear function having the gradient greater than 0. Therefore, the function can be easily set to the CPU 4.

Although the predetermined function is the linear function 5 having the gradient of greater than 0 in this embodiment, the invention is not particularly limited thereto. In other words, the function may well be such that the torque in the opposite direction reaches the upper limit value Tmax when the rotating angle of the rotary knob 1 in one direction shown in FIG. 2 reaches the angle θa, and the torque in one direction reaches the upper limit value Tmax (−Tmax) when the rotating angle of the rotary knob 1 in the opposite direction reaches θa (−θa).

In this embodiment, the electric actuator is the motor. However, the invention is not limited to the motor but may be applied to those electric actuators that operate by electric signals and can impart the torque to the rotary knob 1.

The embodiment described above employs the construction in which the torques in the operating direction and the opposite direction are imparted to the rotary knob 1 capable of rotating both normally and oppositely, but the invention is not limited thereto. In other words, when the force sense imparting inputting apparatus equipped with the operation member capable of linearly operating in both normally and oppositely is constituted, the force in the opposite direction to the operating direction may well be imparted to the operation member.

As explained above, the invention gradually increases the force in the opposite direction to the operating direction given from the electric actuator to the operation member from 0 to the upper limit value with the increase of the operating amount at the start of the operation, and gradually decreases the force at the finish of the operation from the upper limit value to 0 with the increase of the movement amount in the opposite direction to the operating direction of the operation member. Therefore, when the operation is finished before, or at the point at which, the force in the opposite direction to the operating direction imparted to the operation member reaches the upper limit value, the operation member returns to the position at which it has existed before the operation and stops there without oscillation. In other words, the operation member does not easily oscillate and hence, can be kept at halt under the stabilized state.

What is claimed is:

1. A force sense imparting/inputting apparatus comprising:

an operation member capable of operating in both normal and opposite directions;

an electric actuator capable of imparting force in both normal and opposite directions to said operation member;

detection means for detecting an operating direction and an operating amount of said operation member; and control means for controlling said electric actuator so that force in the opposite direction to the operating direction of said operation member can be imparted to said operation member in accordance with the operating direction detected by said detection means;

wherein said control means is set so that:

said—force in the opposite direction to the operating direction imparted from said electric actuator to said operation member increases at a start of operation of said operation member from 0 to a predetermined upper limit value with an increase of the operating amount of said operation member on the basis of a predetermined function;

said force in the opposite direction to the operating direction imparted from said electric actuator to said operation member is kept at said upper limit value during the operation of said operation member; and said force in the opposite direction to the operating direction imparted from said electric actuator to said operation member decreases at a finish of the operation of said operation member from said upper limit value to 0 with the increase of the operating amount of said operation member in the opposite direction to the operating direction of said operation member on the basis of said predetermined function.

2. A force sense imparting/inputting apparatus according to claim 1, wherein said predetermined function is a linear function having a gradient of greater than 0.

3. A force sense imparting/inputting apparatus according to claim 1, wherein said operation member is disposed in such a fashion as to be capable of rotating in both normal and opposite directions, and said electric actuator comprises a motor capable of imparting torque in both normal and opposite directions to said operation member.

* * * * *